United States Patent
Kim et al.

(10) Patent No.: US 11,545,720 B2
(45) Date of Patent: Jan. 3, 2023

(54) LITHIUM-SULFUR BATTERY

(71) Applicant: LG CHEM, LTD., Seoul (KR)

(72) Inventors: Kihyun Kim, Daejeon (KR); Soohyun Kim, Daejeon (KR); Doo Kyung Yang, Daejeon (KR); Sun Mi Jin, Daejeon (KR); Changhoon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 105 days.

(21) Appl. No.: 16/624,750

(22) PCT Filed: May 4, 2018

(86) PCT No.: PCT/KR2018/005189
§ 371 (c)(1),
(2) Date: Dec. 19, 2019

(87) PCT Pub. No.: WO2018/236046
PCT Pub. Date: Dec. 27, 2018

(65) Prior Publication Data
US 2021/0143510 A1 May 13, 2021

(30) Foreign Application Priority Data

Jun. 20, 2017 (KR) .................. 10-2017-0077983
May 3, 2018 (KR) .................. 10-2018-0051030

(51) Int. Cl.
*H01M 50/446* (2021.01)
*H01M 50/403* (2021.01)
(Continued)

(52) U.S. Cl.
CPC ....... *H01M 50/446* (2021.01); *H01M 10/052* (2013.01); *H01M 10/058* (2013.01); *H01M 50/403* (2021.01); *H01M 50/46* (2021.01)

(58) Field of Classification Search
CPC .. H01M 50/446; H01M 50/403; H01M 50/46; H01M 50/449; H01M 10/052; H01M 10/028; H01M 10/058
See application file for complete search history.

(56) References Cited

U.S. PATENT DOCUMENTS

2001/0000485 A1* 4/2001 Ying .................. H01M 50/449
429/204
2004/0115529 A1 6/2004 Nakahara et al.
(Continued)

FOREIGN PATENT DOCUMENTS

CN 102185158 A 9/2011
CN 102969542 A 3/2013
(Continued)

OTHER PUBLICATIONS

Functional composite membrane for lithium sulfur battery and preparation method of functional composite membrane, Shanghai Inst Ceramics, Dec. 9, 2015 (Year: 2015).*
(Continued)

*Primary Examiner* — Matthew T Martin
*Assistant Examiner* — Adam J Francis
(74) *Attorney, Agent, or Firm* — Birch, Stewart, Kolasch & Birch, LLP

(57) ABSTRACT

A lithium-sulfur battery comprising a separator in which an adsorption layer including a radical compound having a nitroxyl radical site is formed, and in particular, to a lithium-sulfur battery suppressing elution of lithium polysulfide by using an adsorption layer including a radical compound having a nitroxyl radical site and optionally a conductive material on at least one surface of a separator. In the lithium-sulfur battery, elution and diffusion may be prevented by a radical compound having a nitroxyl radical site, a stable radical compound, adsorbing lithium polysulfide eluted from positive electrode, and in addition thereto,
(Continued)

electrical conductivity is further provided to provide a reaction site of a positive electrode active material, and as a result, battery capacity and lifetime properties are enhanced.

9 Claims, 6 Drawing Sheets

(51) Int. Cl.
*H01M 50/46* (2021.01)
*H01M 10/052* (2010.01)
*H01M 10/058* (2010.01)

(56) References Cited

U.S. PATENT DOCUMENTS

| | | | |
|---|---|---|---|
| 2005/0156575 A1 | 7/2005 | Mikhaylik | |
| 2012/0015244 A1 | 1/2012 | Kim et al. | |
| 2012/0315545 A1 | 12/2012 | Son et al. | |
| 2014/0023936 A1 | 1/2014 | Belharouak et al. | |
| 2014/0038036 A1* | 2/2014 | Nishide | H01M 4/608 |
| | | | 526/263 |
| 2014/0243444 A1 | 8/2014 | Ikari et al. | |
| 2014/0272569 A1* | 9/2014 | Cai | H01M 4/134 |
| | | | 429/213 |
| 2014/0342214 A1* | 11/2014 | Wegner | H01M 50/411 |
| | | | 429/144 |
| 2015/0303516 A1 | 10/2015 | Pratt | |
| 2015/0318532 A1 | 11/2015 | Manthiram et al. | |
| 2016/0072153 A1 | 3/2016 | Ichikawa et al. | |
| 2016/0233475 A1 | 8/2016 | Son et al. | |

FOREIGN PATENT DOCUMENTS

| | | | | |
|---|---|---|---|---|
| CN | 103160016 A | 6/2013 | | |
| CN | 103490027 A | 1/2014 | | |
| CN | 103515646 A | * 1/2014 | | |
| CN | 103827158 A | 6/2014 | | |
| CN | 103988337 A | 8/2014 | | |
| CN | 105140447 A | * 12/2015 | ......... | H01M 10/052 |
| CN | 105149447 A | 12/2015 | | |
| CN | 105322219 A | 2/2016 | | |
| CN | 105496113 A | 3/2016 | | |
| CN | 105637677 A | 6/2016 | | |
| CN | 104393349 B | 2/2017 | | |
| EP | 3624223 A1 | 3/2020 | | |
| JP | 2002-304996 A | 10/2002 | | |
| KR | 10-2012-0008343 A | 1/2012 | | |
| KR | 10-2016-0146844 A | 12/2016 | | |
| KR | 10-2017-0003604 A | 1/2017 | | |
| WO | WO 2013/087348 A2 | 6/2013 | | |
| WO | WO 2015-160381 A1 | 10/2015 | | |
| WO | WO 2018/236046 A1 | 12/2018 | | |

OTHER PUBLICATIONS

English translation of CN 103515646 A, Lithium sulfur battery with conductive adsorption layer, and application of conductive polymer film, Jan. 15, 2014, UNIV Central South (Year: 2014).*

Extended European Search Report for Application No. 18821205.4, dated Apr. 14, 2020.

Chang et al., "Ultra-lightweight PANiNF/MWCNT-functionalized separators with synergistic suppression of polysulfide migration for Li—S batteries with pure sulfur cathodes", J. Mater. Chem. A, 2015, vol. 3, pp. 18829-18834.

Chen et al., "In-situ activated polycation as a multifunctional additive for Li—S batteries", Nano Energy, 2016, vol. 26, pp. 43-49.

International Search Report (PCT/ISA/210) issued in PCT/KR2018/005189, dated Nov. 2, 2018.

Ma et al., "Enhanced performance of lithium sulfur battery with self-assembly polypyrrole nanotube film as the functional interlayer", Journal of Power Sources, 2015, vol. 273, pp. 511-516.

* cited by examiner

[Figure 1]
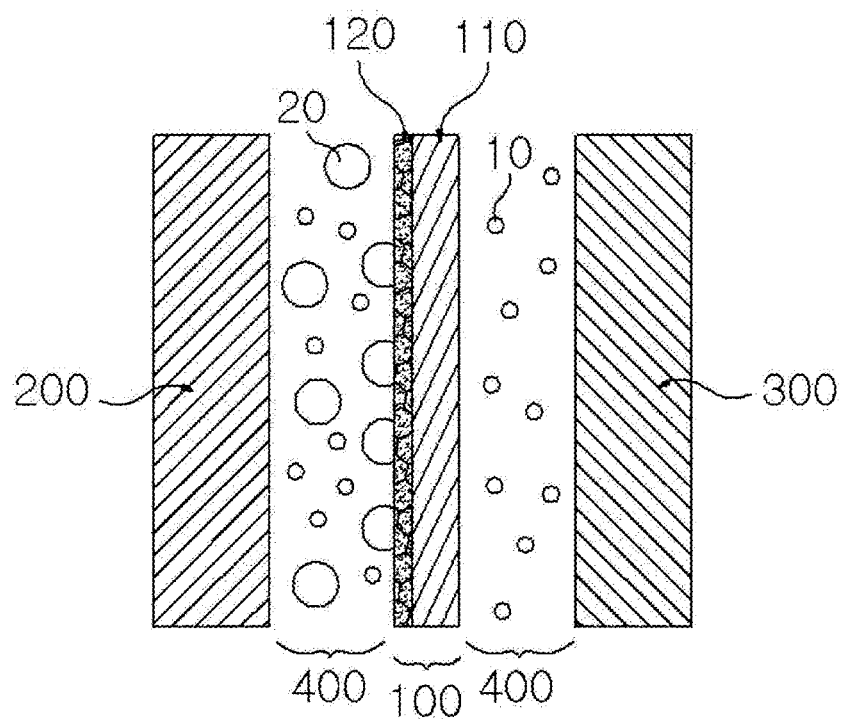
[Figure 2]
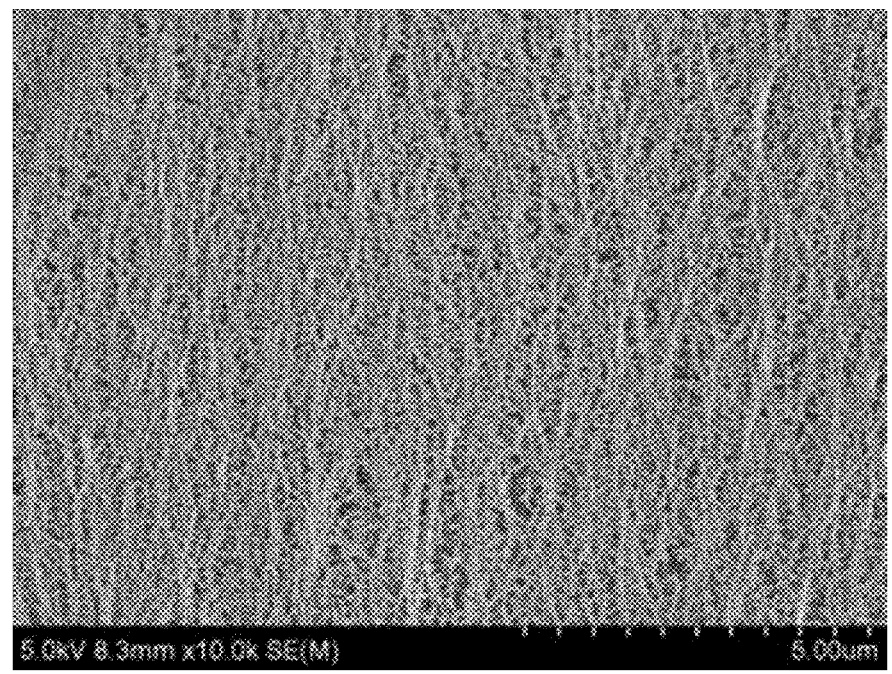

【Figure 3】
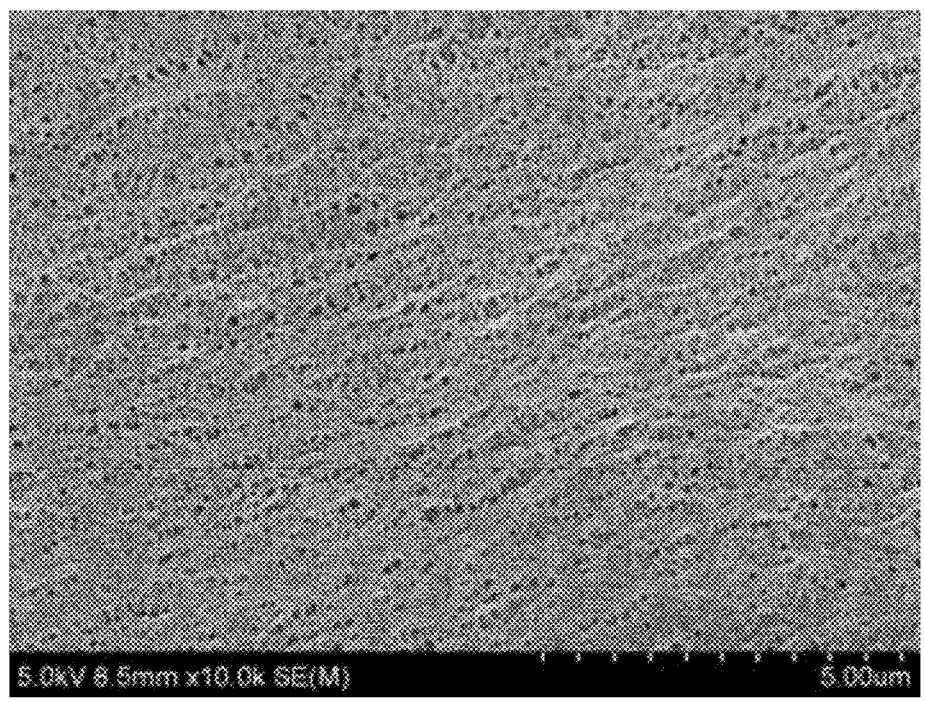
【Figure 4】
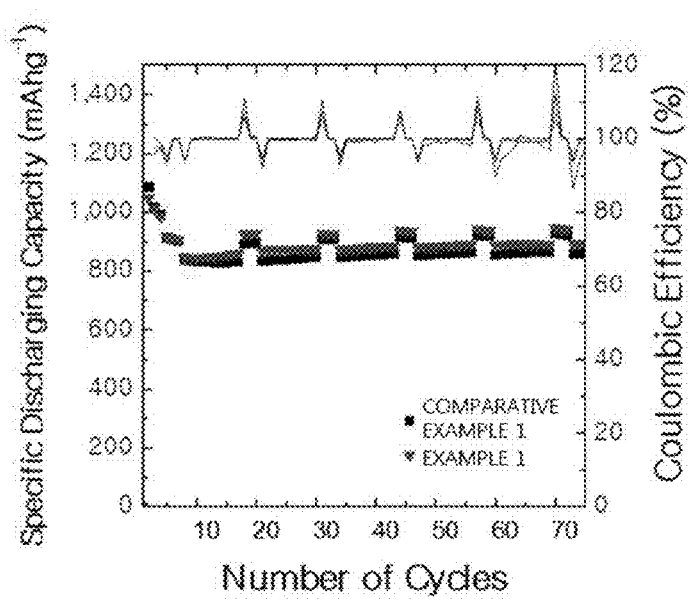

【Figure 5】
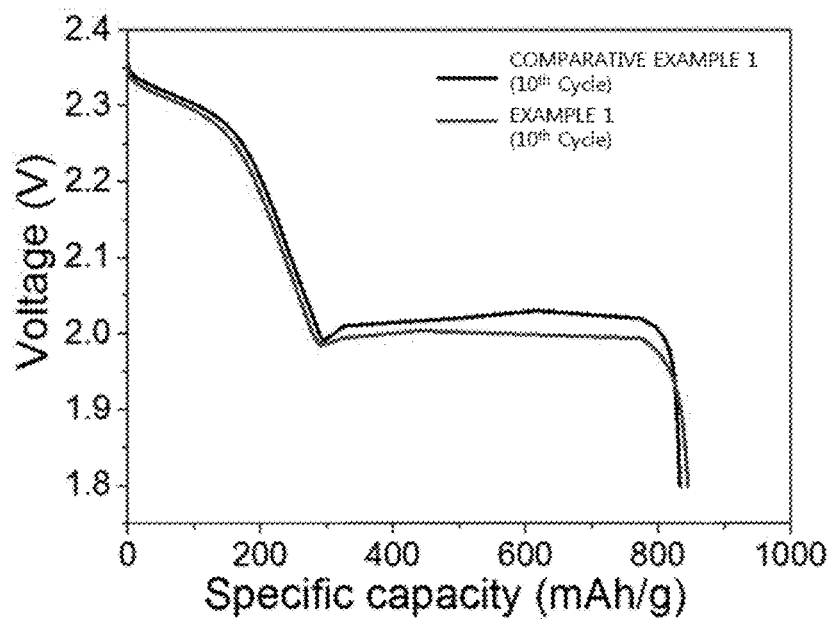
【Figure 6】
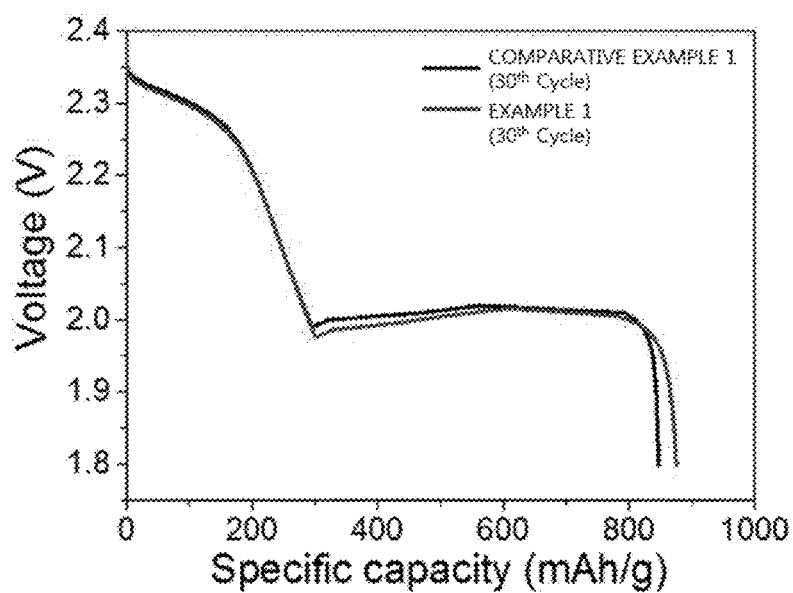

[Figure 7]
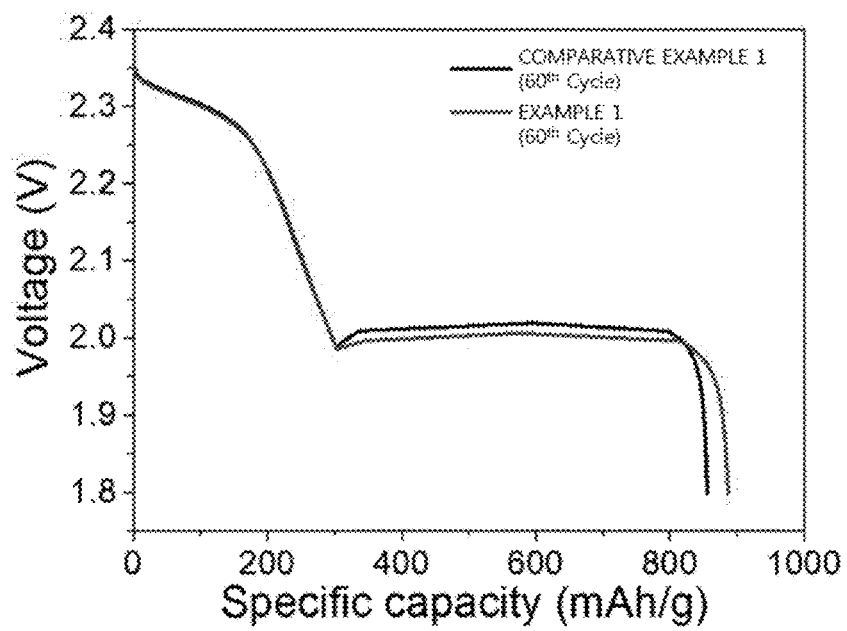
[Figure 8]
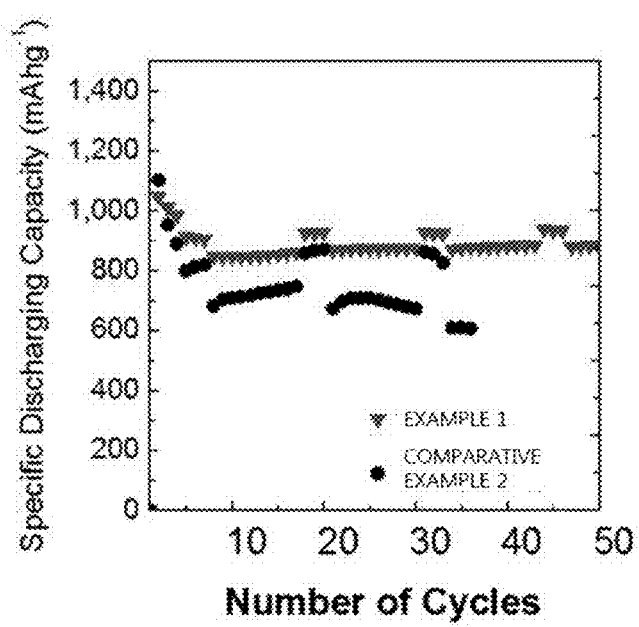

[Figure 9]
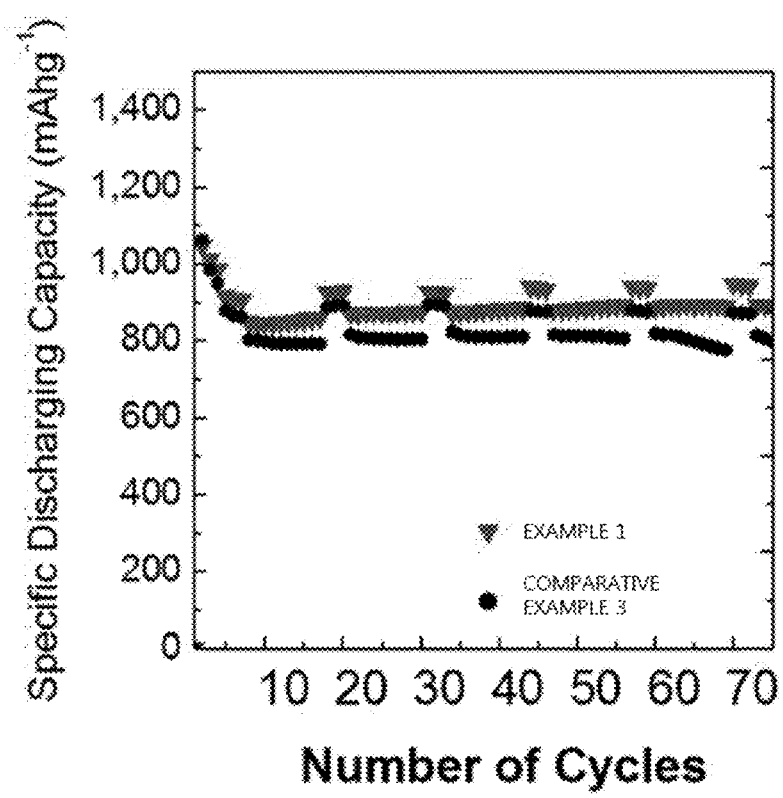

LITHIUM-SULFUR BATTERY

TECHNICAL FIELD

This application claims priority to and the benefits of Korean Patent Application No. 10-2017-0077983, filed with the Korean Intellectual Property Office on Jun. 20, 2017, and Korean Patent Application No. 10-2018-0051030, filed with the Korean Intellectual Property Office on May 3, 2018, the entire contents of which are incorporated herein by reference.

The present invention relates to a lithium-sulfur battery in which an adsorption layer comprising a radical compound having a nitroxyl radical functional group is formed, and in particular, to a lithium-sulfur battery suppressing diffusion of lithium polysulfide by using a coating layer comprising a radical compound having a nitroxyl radical functional group on at least one surface of a separator.

BACKGROUND ART

As electronic goods, electronic devices, communication devices and the like have rapidly become smaller and lighter recently, and necessity of electric vehicles has highly emerged regarding environmental problems, demands for improving performance of secondary batteries used as a power source of these goods have greatly increased. Among these, lithium secondary batteries have received considerable attention as a high performance battery due to their high energy density and high standard electrode potential.

Particularly, lithium-sulfur (Li—S) batteries are a secondary battery using a sulfur series material having sulfur-sulfur (S—S) bonds as a positive electrode active material, and using lithium metal as a negative electrode active material. Sulfur, a main material of a positive electrode active material, has advantages of being very abundant in resources, having no toxicity and having a low atomic weight. In addition, a lithium-sulfur battery has theoretical discharge capacity of 1675 mAh/g-sulfur and theoretical energy density of 2,600 Wh/kg, which is very high compared to theoretical energy density of other battery systems (Ni-MH battery: 450 Wh/kg, Li—FeS battery: 480 Wh/kg, Li—$MnO_2$ battery: 1,000 Wh/kg, Na—S battery: 800 Wh/kg) currently studied, and therefore, is a most promising battery among batteries that have been developed so far.

During a discharge reaction of a lithium-sulfur (Li—S) battery, an oxidation reaction of lithium occurs in a negative electrode (anode), and a reduction reaction of sulfur occurs in a positive electrode (cathode). Sulfur has a cyclic $S_8$ structure before discharge, and electric energy is stored and produced using an oxidation-reduction reaction in which an oxidation number of S decreases as S—S bonds are broken during a reduction reaction (discharge), and an oxidation number of S increases as S—S bonds are formed again during an oxidation reaction (charge). During such a reaction, the sulfur is converted to linear-structured lithium polysulfide ($Li_2S_x$, x=8, 6, 4 and 2) from cyclic $S_8$ by the reduction reaction, and as a result, lithium sulfide ($Li_2S$) is lastly produced when such lithium polysulfide is completely reduced. By the process of being reduced to each lithium polysulfide, a discharge behavior of a lithium-sulfur (Li—S) battery shows gradual discharging voltages unlike lithium ion batteries.

Among lithium polysulfide such as $Li_2Se$, $Li_2S_6$, $Li_2S_4$ and $Li_2S_2$, lithium polysulfide having a high sulfur oxidation number ($Li_2S_x$, commonly x>4) is particularly readily dissolved in a hydrophilic liquid electrolyte. Lithium polysulfide dissolved in the liquid electrolyte is diffused away from a lithium polysulfide-produced positive electrode due to a concentration difference. Lithium polysulfide eluted from the positive electrode as above is washed away out of the positive electrode reaction area making it impossible to be gradually reduced to lithium sulfide ($Li_2S$). In other words, lithium polysulfide present in a dissolved state outside the positive electrode and the negative electrode is not able to participate in charge and discharge reactions of a battery, and therefore, the sulfur material amount participating in an electrochemical reaction in the positive electrode decreases, and as a result, it becomes a main factor causing a charge capacity decrease and an energy decrease of a lithium-sulfur battery.

Furthermore, apart from those floating or immersed in the liquid electrolyte, lithium polysulfide diffusing to the negative electrode directly reacts with lithium and is fixed on the negative electrode surface in a $Li_2S$ form, which causes a problem of corroding the lithium metal negative electrode.

In order to minimize such lithium polysulfide elution, studies on changing morphology of a positive electrode composite filling various carbon structures with sulfur particles have been ongoing, however, such methods are complicated in the preparation and have not resolved fundamental problems.

PRIOR ART DOCUMENTS

Patent Documents (Patent Document 1) Korean Patent Publication No. 10-2016-0146844 (2016.12.21), "Lithium sulfur solid-state electrochemical cell having long cycle lifetime"
(Non-Patent Document 1) Hongwei Chena, Changhong Wanga, Yafei Daib, Jun Gea, Wei Lua and Liwei Chen, In-situ activated polycation as a multifunctional additive for Li—S batteries. Nano Energy. 2016. 26. 43-49.

DISCLOSURE

Technical Problem

As described above, lithium-sulfur batteries have a problem in that battery capacity and life time properties decline due to lithium polysulfide eluted and diffused from a positive electrode. As a result of extensive studies in view of the above, the inventors of the present invention have identified that a radical compound having a nitroxyl radical functional group, a stable free radical molecule, is effective in adsorbing lithium polysulfide, and have completed the present invention.

Accordingly, an aspect of the present invention provides a separator comprising a polysulfide adsorption layer to enhance battery capacity and lifetime properties.

Another aspect of the present invention provides a method for preparing the separator comprising a polysulfide adsorption layer.

Still another aspect of the present invention provides a lithium-sulfur battery comprising the separator.

Technical Solution

According to an aspect of the present invention, there is provided a lithium-sulfur battery comprising
a positive electrode comprising a sulfur-carbon composite;

a negative electrode disposed opposite to the positive electrode; and a separator provided between the positive electrode and the negative electrode, wherein the separator comprises a separator body; and a lithium polysulfide adsorption layer formed on at least one surface of the separator body, and the adsorption layer comprises a radical compound having a nitroxyl radical functional group.

According to another aspect of the present invention, there is provided a method for manufacturing the lithium-sulfur battery, wherein the separator is prepared comprising i) preparing a separator body; ii) preparing a solution by mixing a radical compound having a nitroxyl radical site to a solvent; iii) coating the solution on at least one surface of the separator body; and iv) forming a lithium polysulfide adsorption layer by drying the coated separator.

Advantageous Effects

In a lithium-sulfur battery according to the present invention, a radical compound having a nitroxyl radical functional group adsorbs lithium polysulfide eluted from a positive electrode preventing elution and diffusion of the lithium polysulfide, and as a result, battery capacity and lifetime properties are enhanced.

DESCRIPTION OF DRAWINGS

FIG. 1 is a sectional diagram of a lithium-sulfur battery comprising a separator having a lithium sulfide adsorption layer.

FIG. 2 is a scanning electron microscope (SEM) image of a separator coated with poly(2,2,6,6-tetramethyl-1-piperidinyloxyl-4-yl methacrylate (PTMA), a radical compound having a nitroxyl radical functional group.

FIG. 3 is a scanning electron microscope (SEM) image of a separator that is not coated with PTMA.

FIG. 4 is a graph presenting battery lifetime property effects of specific discharging capacity and Coulombic efficiency according to Example 1 and Comparative Example 1 of the present invention.

FIG. 5 is a graph presenting discharging capacity of a lithium-sulfur battery after 10 cycles.

FIG. 6 is a graph presenting discharging capacity of a lithium-sulfur battery after 30 cycles.

FIG. 7 is a graph presenting discharging capacity of a lithium-sulfur battery after 60 cycles.

FIG. 8 is a graph presenting battery lifetime property effects of specific discharging capacity and Coulombic efficiency according to Example 1 and Comparative Example 2 of the present invention.

FIG. 9 is a graph presenting battery lifetime property effects of specific discharging capacity and Coulombic efficiency according to Example 1 and Comparative Example 3 of the present invention.

BEST MODE

Figure 10:
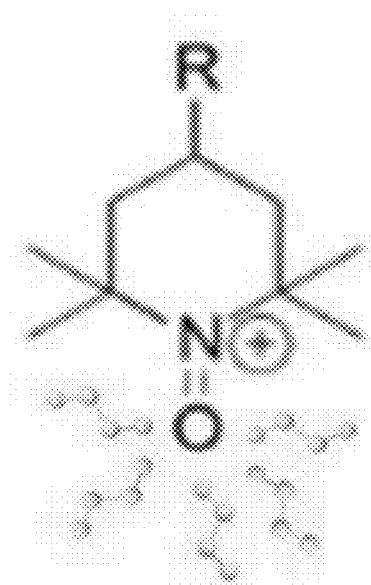
FIG. 10 shows a chemical formula where PTMA performs a function of adsorbing polysulfide, where the polysulfide molecules are represented as ball-and-stick molecules in the formula.

Hereinafter, preferred embodiments of the present invention will be described in detail with reference to accompanying illustrative drawings. Such drawings are one embodiment for describing the present invention, and may be implemented in various different forms, and are not limited to the present specification.

Separator for Lithium-Sulfur Battery

The present invention provides, for enhancing battery capacity and lifetime by preventing lithium polysulfide diffusion, a lithium polysulfide adsorption layer comprising a radical compound having a nitroxyl radical functional group on at least one surface of a separator body, and a separator for a lithium-sulfur battery comprising the same. At least one surface of the separator body is one surface or both surfaces required to comprise a surface opposite to a positive electrode when assembling a battery.

In addition, the radical compound having a nitroxyl radical functional group may be located both on a surface or inside the separator, and may be preferably located on a separator surface opposite to a positive electrode in order to prevent diffusion of lithium polysulfide produced on the positive electrode of a lithium-sulfur battery.

FIG. 1 is a sectional diagram illustrating a lithium-sulfur battery according to the present invention. As illustrated in FIG. 1, the lithium-sulfur battery has a structure comprising a positive electrode (200) and a negative electrode (300), and an electrolyte (400) and a separator (100) provided therebetween, and particularly, the present invention provides a separator (100) in which a separator body (110) and an adsorption layer (120) are consecutively laminated. Herein, the adsorption layer (120) may be formed on one side surface of the separator body (110) as illustrated in FIG. 1, and as necessary, the adsorption layer may be formed on both side surfaces.

The separator body (110) is not particularly limited in its material in the present invention, and those commonly used as a separator with functions of physically separating electrodes and having electrolyte and ion penetrability may be used without particular limit, however, as a material that is porous and nonconductive or insulating, those having an excellent electrolyte liquid moisture retention ability while having low resistance for ion migration of the electrolyte liquid are particularly preferred.

Specifically, as the separator body (110), porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber or polyethylene terephthalate fiber may be used. However, the separator body is not limited thereto.

The radical compound having a nitroxyl radical functional group comprised in the adsorption layer (120) means a structure having a functional group of the following Chemical Formula 1.

[Chemical Formula 1]

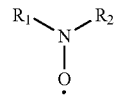

In Chemical Formula 1, $R_1$ and $R_2$ may each be aliphatic, aromatic, a hydroxyl group, an alkoxy group, an aldehyde group, a carboxyl group, an amino group or a combination thereof, and adjacent groups may bond to each other to form a ring, and $R_1$ and $R_2$ may be different from or the same as each other.

In addition, the radical compound provided in the present invention may be a polymer having a nitroxyl radical functional group in the molecule.

Herein, the polymer may be polymerized from a monomer comprising any one functional group selected from the group consisting of (meth)acrylate, acrylonitrile, an anhydride, styrene, epoxy, isocyanate and a vinyl group.

The polymer may be one or more types selected from the group consisting of poly(2,2,6,6-tetramethyl-1-piperidinyloxyl-4-yl (meth)acrylate (PT(M)A), poly(2,2,6,6-tetramethyl-1-piperidinyloxyl-4-yl vinyl ether (PTVE), poly (TEMPO-substituted norbornene) (PTN), poly(2,2,5,5-tetramethylpyrrolidine-1-oxyl-3-yl ethylene oxide (PTEO), poly[2,3-bis(2,2,6,6-tetramethylpiperidine-1-oxyl-4-oxycarbonyl)-5-norbonene] (PTNB), poly(tetramethylpiperidinoxy)acrylamide (PTAm) and combinations thereof. Herein, the TEMPO means a (2,2,6,6-tetramethylpiperidin-1-yl) oxyl compound.

In addition, since the radical compound having a nitroxyl radical functional group is a polymer and may form an adsorption layer by itself, the content of the radical compound having a nitroxyl radical functional group may be 80% by weight or greater of the total weight of the adsorption layer in the present invention.

The following Chemical Formula 2 represents PTMA, one type of a polymer comprising a nitroxyl radical functional group in the molecule and formed by a polymerization reaction provided in the present invention.

[Chemical Formula 2]

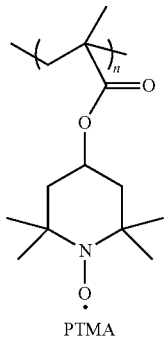

PTMA

A monomer type in the PTMA is a 2,2,6,6-tetramethylpiperidin-1-yl)oxyl (TEMPO) compound, and may form the PTMA by being attached to the polymer backbone.

PTMA, a radical compound provided in the present invention, is a compound relatively stable due to a phenomenon of delocalization from nitrogen to oxygen, and stability of the PTMA may be described through the following Chemical Formula 3.

[Chemical Formula 3]

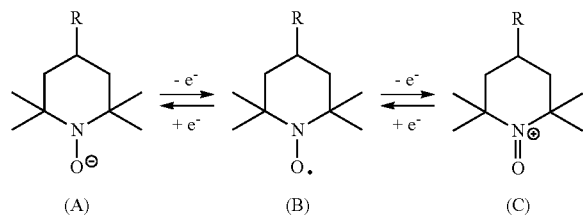

When examining Chemical Formula 3, PTMA losing electrons in the (B) state changes to an activated cation in the (C) state, and PTMA in the (C) state performs a function of adsorbing polysulfide (ball-and-stick molecules shown in FIG. 10).

In addition, the present invention uses PTMA that is a polymer, and such PTMA has an advantage in that it is capable of being coated on a separator without being dissolved in an electrolyte liquid due to a high molecular weight.

In addition, the adsorption layer (120) of the present invention may comprise a conductive material together with the radical compound having a nitroxyl radical functional group described above in order to provide additional electric conductivity to a lithium-sulfur battery. Sulfur, a positive electrode active material of a lithium-sulfur battery, does not have conductivity by itself, and therefore is generally composited with a conductive carbon-based material to be prepared as a positive electrode (200) of a sulfur-carbon composite. The adsorption layer (120) of the present invention comprises a conductive material, and thereby may provide an additional reduction reaction site of a sulfur material in addition to a positive electrode reaction site.

More specifically, due to a porous structure of the conductive material, the adsorption layer (120) adsorbs lithium polysulfide ($Li_2S_x$, x=8,6,4,2) (20), an intermediate product during sulfur reduction, and thereby may suppress diffusion. In addition, electrode efficiency may increase by the conductive material of the adsorption layer (120) additionally providing a reduction reaction site of the adsorbed lithium polysulfide (20).

The conductive material comprised in the adsorption layer (120) according to the present invention may be selected from the group consisting of carbon-based conductors, conductive polymers and combinations thereof.

The carbon-based conductor is not limited in the type, but may comprise one type selected from the group consisting of graphite-based such as natural graphite, artificial graphite, expanded graphite, graphene, Super-P or Super-C, active carbon-based, carbon black-based such as channel black, denka black, furnace black, thermal black, contact black, lamp black or acetylene black; carbon fiber-based, carbon nanostructures such as carbon nanotubes (CNT) or fullerene, and combinations thereof, and preferably, Super-P may be used.

The conductive polymer is not limited in the type, but may comprise one type selected from the group consisting of polyaniline, polypyrrole, polythiophene, polyazulene, polypyridine, polyindole, polycarbazole, polyazine, polyquinone, polyacetylene, polyselenophene, polytellurophene, poly-para-phenylene, polyphenylene vinylene, polyphenylene sulfide, polyethylenedioxythiophene, polyethylene glycol and combinations thereof.

In order to obtain the effect of preventing lithium polysulfide diffusion described above and to obtain the effect of providing conductivity for providing a reduction reaction site of lithium polysulfide, a weight ratio between the radical compound having a nitroxyl radical functional group and the conductive material may be controlled within a range of 3:1 to 7:1. When the radical compound having a nitroxyl radical functional group is used in excess compared to the above-mentioned range, it functions as a resistive layer causing a problem of battery performance decline, and when the conductive material is used in excess on the contrary, the content of the radical compound having a nitroxyl radical functional group relatively decreases making it difficult to secure an effect obtained by the radical compound, and therefore, the content is preferably properly employed within the above-mentioned range.

In order to secure the above-mentioned effects, such an adsorption layer (120) may be formed to a thickness of 0.1 µm to 10 µm and preferably 0.1 µm to 5 µm on the separator body (110). When the thickness is less than the above-mentioned range, an effect of lithium polysulfide adsorption is insignificant, and when the thickness is greater than the above-mentioned range on the contrary, lithium ion conductivity decreases causing a problem in the battery performance, and therefore, the thickness is preferably properly employed within the above-mentioned range.

In addition, the present invention provides a lithium-sulfur battery comprising a positive electrode comprising a sulfur-carbon composite; a negative electrode disposed opposite to the positive electrode; and a separator provided between the positive electrode and the negative electrode, wherein a portion of the separator comprises tetramethylpiperidine N-oxyl. Herein, the tetramethylpiperidine N-oxyl comprised in the separator may be dissolved in an electrolyte while discharging and charging a battery.

Method for Preparing Separator for Lithium-Sulfur Battery

The separator of a lithium-sulfur battery according to the present invention may be prepared comprising i) preparing a separator body; ii) preparing a solution by mixing a radical compound having a nitroxyl radical site to a solvent; iii) coating the solution on at least one surface of the separator body; and iv) forming a lithium polysulfide adsorption layer by drying the coated separator.

First, a separator body (110) is prepared. The separator body (110) is not particularly limited in the present invention, and any one of the separator bodies described above may be selected. The separator body may be directly prepared, or commercially-available separators may be purchased to be used.

Next, a radical compound solution is prepared by dispersing a radical compound having a nitroxyl radical functional group in a predetermined solvent. As the solvent, those capable of uniformly dispersing the radical compound and readily evaporating for simple drying are preferably used. Specifically, N-methyl-2-pyrrolidone (NMP), acetonitrile, methanol, ethanol, tetrahydrofuran, water, isopropyl alcohol and the like may be comprised, and NMP is preferably used. In addition, as for the mixing for preparing the radical compound solution, common methods may be used for the stirring using common mixers such as a paste mixer, a high shear mixer and a homo-mixer.

Next, the prepared solution is coated on one surface of the separator body (110). Herein, one surface of the separator body (110) is one surface of the separator body (110) assembled opposite a positive electrode (200) when assembling an electrode afterward. Herein, examples of the method of coating the slurry may comprise methods of doctor blade coating, dip coating, gravure coating, slit die coating, spin coating, comma coating, bar coating, reverse roll coating, screen coating, cap coating and the like.

Next, the coated separator is dried to form an adsorption layer (120). The drying process is a process removing the solvent and moisture in the adsorption layer coated on the separator, and drying temperature and time may vary depending on the solvent used. Generally, the drying is preferably carried out for 48 hours or less in a vacuum oven at 50° C. to 200° C.

In addition, in the adsorption layer (120), the radical compound having a nitroxyl radical functional group according to the present invention is a polymer and may form the adsorption layer by itself, and therefore, the content of the radical compound may be 80% by weight or greater of the total weight of the adsorption layer.

Lithium-Sulfur Battery

The present invention provides a lithium-sulfur battery comprising a positive electrode comprising a sulfur-carbon composite; a negative electrode disposed opposite to the positive electrode; and a separator provided between the positive electrode and the negative electrode, wherein the separator comprises a separator body; and a lithium polysulfide adsorption layer formed on at least one surface of the separator body, and the adsorption layer comprises a radical compound having a nitroxyl radical functional group.

The separator (100) provided in the present invention may be preferably used as a separator of a lithium-sulfur battery, and as illustrated in FIG. 1, the separator (100) is provided between a positive electrode (200) and a negative electrode (300), and when an adsorption layer (120) is coated on only one surface, the adsorption layer (120) is preferably disposed opposite to the positive electrode (200) in the assembly in order to prevent polysulfide diffusion.

The positive electrode (200) may comprise elemental sulfur ($S_8$), sulfur series compounds or mixtures thereof as a positive electrode active material, and these may be used as a composite with a conductor since a sulfur material itself does not have electrical conductivity. The sulfur series compound may specifically be $Li_2S_n(n \geq 1)$, an organosulfur compound, a carbon-sulfur polymer $((C_2S_x)_n: x=2.5$ to $50, n \geq 2)$ or the like.

As the positive electrode of the lithium-sulfur battery, a sulfurized poly-acrylonitrile (SPAN) positive electrode having favorable lifetime properties may be used. However, the SPAN positive electrode has an average operating voltage of 1.7 V, which is low in the energy density compared to a sulfur-carbon composite positive electrode having an average operating voltage of 2.1 V, and the SPAN positive electrode also has a lower sulfur content compared to a sulfur-carbon composite positive electrode by closer to 40%, and therefore, the positive electrode of the lithium-sulfur battery is limited to a sulfur-carbon composite positive electrode in the present invention.

The conductor may be porous. Accordingly, as the conductor, those having porosity and conductivity may be used without limit, and for example, carbon-based materials having porosity may be used. As such carbon-based materials, carbon black, graphite, graphene, active carbon, carbon fiber, carbon nanotubes (CNT) and the like may be used. In addition, metallic fibers such as metal mesh; metallic powders such as copper, silver, nickel and aluminum; or organic conductive materials such as polyphenylene derivatives may also be used. The conductive materials may be used either alone or as a mixture.

The negative electrode (300) may use a material capable of reversibly intercalating or deintercalating lithium ions (10) ($Li^+$), a material capable of reversibly forming a lithium-containing compound by reacting with lithium ions, lithium metal or a lithium alloy as a negative electrode active material. Examples of the material capable of reversibly intercalating or deintercalating lithium ions (10) ($Li^+$) may comprise crystalline carbon, amorphous carbon or a mixture thereof. Examples of the material capable of reversibly forming a lithium-containing compound by reacting with lithium ions (10) ($Li^+$) may comprise tin oxide, titanium nitrate or silicon. Examples of the lithium alloy may comprise alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), silicon (Si) and tin (Sn).

In addition, while charging and discharging a lithium-sulfur battery, sulfur used as a positive electrode active material may be changed to an inactive material and attached on a lithium negative electrode surface. Inactive sulfur means sulfur that has gone through various electrochemical or chemical reactions and is not able to participate in an electrochemical reaction of a positive electrode any more, and the inactive sulfur formed on the lithium negative electrode surface has an advantage of performing a role of a protective layer of the lithium negative electrode.

An electrolyte (400) impregnated into the positive electrode (200), the negative electrode (300) and the separator (100) is, as a lithium salt-containing non-aqueous electrolyte, formed with a lithium salt and a liquid electrolyte, and in addition thereto, an organic solid electrolyte, an inorganic solid electrolyte and the like may be used.

The lithium salt of the present invention is a material to be favorably dissolved in a non-aqueous organic solvent, and for example, one or more selected from the group consisting of LiCl, LiBr, LiI, LiClO$_4$, LiBF$_4$, LiB$_{10}$Cl$_{10}$, LiB(Ph)$_4$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, LiNO$_3$, chloroborane lithium, lower aliphatic carboxylic acid lithium, lithium tetraphenylborate and lithium imide may be comprised.

The concentration of the lithium salt may be from 0.2 M to 4 M, specifically from 0.3 M to 2 M and more specifically from 0.3 M to 1.5 M depending on various factors such as an accurate composition of the liquid electrolyte mixture, solubility of the salt, conductivity of the dissolved salt, charge and discharge conditions of a battery, a working temperature, and other factors known in the lithium-sulfur battery field. When the lithium salt concentration is less than 0.2 M, conductivity of the electrolyte may decrease causing decline in the battery performance, and when the lithium salt concentration is greater than 4 M, viscosity of the electrolyte increases leading to a decrease in the lithium ion (Li$^+$) mobility.

The non-aqueous organic solvent needs to favorably dissolve the lithium salt, and examples of the non-aqueous organic solvent of the present invention may comprise aprotic organic solvents such as N-methyl-2-pyrrolidinone, propylene carbonate, ethylene carbonate, butylene carbonate, dimethyl carbonate, diethyl carbonate, ethyl methyl carbonate, gamma-butyrolactone, 1,2-dimethoxyethane, 1,2-di ethoxyethane, tetrahydroxy furan, 2-methyl tetrahydrofuran, dimethyl sulfoxide, 1,3-dioxolane, 4-methyl 1,3 dioxane, diethyl ether, formamide, dimethylformamide, dioxolane, acetonitrile, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate or ethyl propionate may be used, and the organic solvent may be used either alone or as a mixture of two or more organic solvents.

As the organic solid electrolyte, for example, polyethylene derivatives, polyethylene oxide derivatives, polypropylene oxide derivatives, phosphoric acid ester polymers, polyalginate lysine, polyester sulfide, polyvinyl alcohol, polyvinylidene fluoride, polymers comprising an ionic dissociation group, and the like may be used.

As the inorganic solid electrolyte of the present invention, for example, nitrides, halides, sulfates and the like of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH or Li$_3$PO$_4$—Li$_2$S—SiS$_2$ may be used.

With the purpose of improving charge and discharge properties and flame retardancy, for example, pyridine, triethylphosphite, triethanolamine, cyclic ether, ethylenediamine, diglyme, hexamethyl phosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride or the like may also be added to the electrolyte of the present invention. In some cases, halogen-containing solvents such as carbon tetrachloride and trifluoroethylene may be further comprised in order to provide nonflammability, carbon dioxide gas may be further comprised in order to enhance high temperature storage properties, and fluoroethylene carbonate (FEC), propene sultone (PRS), fluoropropylene carbonate (FPC) and the like may be further included.

In addition, the lithium-sulfur battery according to the present invention may comprise additives commonly used in the field of lithium-sulfur batteries, and preferably, vinylene carbonate (VC) or ethylene carbonate (EC) may be comprised.

A stack-type electrode assembly may be prepared by providing, between a positive electrode plate and a negative electrode plate obtained by cutting the positive electrode (200) and the negative electrode (300) described above to a predetermined size, a separator (100) cut to a predetermined size corresponding to the positive electrode plate and the negative electrode plate, and then stacking the result.

In addition, a stack and folding-type electrode assembly may be prepared by, so as to provide a positive electrode (200) and a negative electrode (300) opposite to each other with a separator (100) sheet therebetween, arranging two or more positive electrode plates and negative electrode plates on a separator sheet or arranging two or more unit cells laminating the two or more positive electrode plates and negative electrode plates with a separator therebetween on a separator sheet, and winding the separator sheet or folding the separator sheet to the size of the electrode plate or the unit cell.

A battery pack comprising the lithium-sulfur battery may be used as a power supply of electric vehicles (EV), hybrid electric vehicles (HEV), plug-in hybrid electric vehicles (PHEV) or systems for power storage.

Hereinafter, the present invention will be described in detail with reference to examples. However, examples according to the present invention may be modified to various different forms, and the scope of the present invention is not to be construed as being limited to the examples described below. The examples of the present invention are provided to those having average knowledge in the art in order to more fully describe the present invention.

EXAMPLE

Preparation Example. Preparation of Separator

A PTMA 1 wt % solution was prepared by dissolving PTMA in N-methyl-2-pyrrolidone (NMP).

On a polypropylene separator having a thickness of 20 μm, the solution was coated using a bar coater, and then a 0.5 μm PTMA-coated separator was prepared after going through a vacuum drying process.

Example 1. Manufacture of Lithium-Sulfur Battery

A positive electrode mixture having a composition of 70% by weight of a positive electrode active material prepared by mixing carbon and sulfur in a weight ratio of 9:1, 20% by weight of denka black as a conductor, and 10% by weight of SBR/CMC (weight ratio 1:1) as a binder was added to D.I water to prepare positive electrode slurry, and then the slurry was coated on an aluminum current collector to prepare a positive electrode. In the binder, SBR is styrene butadiene rubber, and CMC is carboxymethylcellulose.

Lithium foil having a thickness of 150 μm was used as a negative electrode. To the separator prepared in the Preparation Example, 70 μL of an electrolyte liquid mixing 1 M LiN(CF$_3$SO$_2$)$_2$-dissolved dimethoxyethane and dioxolane in a volume ratio of 1:1 was interposed, and the separator was provided between the positive electrode and the negative electrode to prepare an electrode assembly. The electrode assembly was stored in a battery case to manufacture a lithium-sulfur battery coin cell.

Comparative Example

Comparative Preparation Example. Preparation of Separator not Containing PTMA

A separator was prepared in the same manner as in the Preparation Example except that, instead of the separator having a PTMA solution coated on polypropylene, a polypropylene film having a thickness of 20 μm on which a PTMA solution is not coated was used as the separator.

Comparative Example 1. Manufacture of Lithium-Sulfur Battery

A coin cell was manufactured in the same manner as in Example 1 except that, instead of the separator having a PTMA solution coated on polypropylene, the separator of Comparative Preparation Example 1 was used.

Comparative Example 2. Manufacture of Lithium-Sulfur Battery

A lithium-sulfur battery coin cell was manufactured in the same manner as in Example 1 except that PTMA was not coated on the separator, and the positive electrode was prepared by adding a positive electrode mixture having a composition of 70% by weight of a positive electrode active material prepared by mixing carbon and sulfur in a weight ratio of 9:1, 20% by weight of denka black as a conductor, 9% by weight of SBR/CMC (weight ratio 1:1) as a binder and 1% by weight of PTMA to D.I water to prepare positive electrode slurry, and then coating the slurry on an aluminum current collector.

Comparative Example 3. Manufacture of Lithium-Sulfur Battery

A lithium-sulfur battery coin cell was manufactured in the same manner as in Example 1 except that, instead of the PTMA-coated polypropylene separator, a separator having PTMA impregnated into the separator by loading the separator in a PTMA solution for 1 minute was used.

Result of Separator Surface Analysis

Surfaces of the separators of Preparation Example and Comparative Preparation Example were identified through a scanning electron microscope (SEM).

As a result of identifying the separator surface according to Preparation Example (FIG. 2), no significant changes were observed on the surface before and after the coating compared to the separator surface according to Comparative Preparation Example (FIG. 3), and it was identified that the PTMA solution was thinly and uniformly coated on the separator.

Result of Resistance Measurement

Three identical coin cells were manufactured according to each of Example 1 and Comparative Example 1, and resistance of each sample was measured.

An average and a standard deviation of the resistance measurement values for each of the samples are shown in the following Table 1.

TABLE 1

| Sample Name | Measured Resistance Value (ohm) |
| --- | --- |
| Comparative Example 1 | 1.3 ± 0.4 |
| Example 1 | 1.4 ± 0.4 |

As a result of measuring resistance values for each set of 3 samples and identifying an average and a standard deviation thereof, an increase in the resistance of the battery using the PTMA solution-coated separator was insignificant compared to Comparative Example 1. Accordingly, it was identified that there was almost no battery performance decline caused by an increase in the resistance after the coating.

Test on Lifetime Properties of Lithium-Sulfur Battery

In order to compare lifetime properties of the batteries of Example 1 and Comparative Examples 1 to 3, charge and discharge were repeated under the following condition to measure specific discharging capacity and Coulombic efficiency.

Charge: voltage 2.6 V termination condition, CC/CV (5% current cut at 0.1 C)

Discharge: voltage 1.8 V termination condition, CC

For both charge/discharge, evaluate with a rate of 0.1 C for first 3 cycles, a rate of 0.2 C for next 3 cycles, and 0.5 C thereafter (evaluate with 0.2 C 3 times for every 10 cycles)

Specific discharging capacity and Coulombic efficiency of the batteries of Example 1 and Comparative Example 1 are each shown in FIG. 4.

When referring to FIG. 4, it was seen that Example 1, a lithium-sulfur battery using the PTMA-coated separator exhibited significantly improved capacity retention rate and Coulombic efficiency compared to Comparative Example 1.

When referring to FIG. 8, it was seen that Comparative Example 2 using PTMA as a binder of a lithium-sulfur battery instead of coating on a separator had decreased battery capacity retention rate and Coulombic efficiency compared to Example 1.

In addition, Comparative Example 3 impregnating PTMA into a separator had decreased lithium ion conductivity since separator pores were blocked, and it was seen through FIG. 9 that battery capacity retention rate and Coulombic efficiency also decreased compared to Example 1.

Test on Discharging Cycle Properties of Lithium-Sulfur Battery

In order to compare battery discharging properties of Example 1 and Comparative Example 1, discharging capacity depending on charging and discharging cycles was measured.

When comparing FIG. 5 to FIG. 7, it was seen that, due to a polysulfide adsorption effect by PTMA, the lithium-sulfur battery of Example 1 exhibited capacity of approximately 890 mAh/g, which was more superior than Comparative Example 1, after 10 cycles, 30 cycles and even 60 cycles.

REFERENCE NUMERAL

10. Lithium Ion
20. Lithium Polysulfide
100. Separator
110. Separator Body
120. Adsorption Layer
200. Positive Electrode
300. Negative Electrode
400. Electrolyte By suppressing polysulfide diffusion, the lithium-sulfur battery of the present invention improves electrode loading and initial discharging capacity, and ultimately increases energy density of the lithium-sulfur battery as well. As a result, the lithium-sulfur battery may be preferably used as a high density battery or a high performance battery.

The invention claimed is:

1. A lithium-sulfur battery comprising:
a positive electrode comprising a sulfur-carbon composite;
a negative electrode disposed opposite to the positive electrode; and
a separator provided between the positive electrode and the negative electrode,
wherein the separator comprises a separator body; and a lithium polysulfide adsorption layer formed on at least one surface of the separator body, and
the adsorption layer comprises a radical compound having a nitroxyl radical functional group and a conductive polymer,
wherein the conductive polymer is one or more selected from the group consisting of polyaniline, polyazulene, polypyridine, polyindole, polycarbazole, polyazine, polyquinone, polyacetylene, polyselenophene, polytellurophene, poly-para-phenylene, polyethylenedioxythiophene, polyethylene glycol and combinations thereof, and
wherein a weight ratio of the radical compound having the nitroxyl radical functional group to the conductive polymer is in a range of 3:1 to 7:1.

2. The lithium-sulfur battery of claim 1, wherein the radical compound is a polymer having the nitroxyl radical functional group in a molecule thereof.

3. The lithium-sulfur battery of claim 2, wherein the polymer having the nitroxyl radical functional group is polymerized from a monomer comprising any one functional group selected from the group consisting of (meth)acrylate, acrylonitrile, an anhydride, styrene, epoxy, isocyanate and a vinyl group.

4. The lithium-sulfur battery of claim 2, wherein the polymer having the nitroxyl radical functional group is one or more selected from the group consisting of poly(2,2,6,6-tetramethyl-1-piperidinyloxyl-4-yl (meth)acrylate, poly(2,2,6,6-tetramethyl-1-piperidinyloxyl-4-yl vinyl ether, poly(TEMPO-substituted norbornene), poly(2,2,5,5-tetramethylpyrrolidine-1-oxyl-3-yl ethylene oxide, poly[2,3-bis(2,2,6,6-tetramethylpiperidine-1-oxyl-4-oxycarbonyl)-5-norbonene], poly(tetramethylpiperidinoxy)acrylamide and combinations thereof.

5. A lithium-sulfur battery comprising:
a positive electrode comprising a sulfur-carbon composite;
a negative electrode disposed opposite to the positive electrode; and
a separator provided between the positive electrode and the negative electrode,
wherein a portion of the separator comprises tetramethylpiperidine N-oxyl and a conductive polymer,
wherein the conductive polymer is one or more selected from the group consisting of polyaniline, polyazulene, polypyridine, polyindole, polycarbazole, polyazine, polyquinone, polyacetylene, polyselenophene, polytellurophene, poly-para-phenylene, polyethylenedioxythiophene, polyethylene glycol and combinations thereof, and
wherein a weight ratio of the tetramethylpiperidine N-oxyl to the conductive polymer is in a range of 3:1 to 7:1.

6. The lithium-sulfur battery of claim 2, wherein the polymer is poly(2,2,6,6-tetramethyl-1-piperidinyloxyl-4-yl methacrylate.

7. The lithium-sulfur battery of claim 1, wherein a content of the radical compound having the nitroxyl radical functional group is 80% by weight or greater based upon a total weight of the adsorption layer.

8. The lithium-sulfur battery of claim 1, wherein the adsorption layer has a thickness of 0.1 μm to 10 μm.

9. A method for manufacturing the lithium-sulfur battery of claim 1, comprising preparing the separator by a method comprising:
i) preparing a separator body;
ii) preparing a solution by mixing a radical compound having a nitroxyl radical site to a solvent;
iii) coating the solution on at least one surface of the separator body; and
iv) forming a lithium polysulfide adsorption layer by drying the coated separator.

* * * * *